United States Patent
Arwe et al.

(10) Patent No.: US 8,171,122 B2
(45) Date of Patent: May 1, 2012

(54) VISUALIZATION OF WEB SERVICES DISTRIBUTED MANAGEMENT (WSDM) RESOURCES

(75) Inventors: John Elliott Arwe, Poughkeepsie, NY (US); Michael John Branson, Rochester, MN (US); David Arlen Elko, Austin, TX (US); Anthony Wayne Erwin, Rochester, MN (US); Jeffrey Alan Frey, New Paltz, NY (US); Steven Gene Halverson, Rochester, MN (US); Georg Ochs, Mötzingen (DE)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/766,962

(22) Filed: Jun. 22, 2007

(65) Prior Publication Data

US 2008/0320120 A1   Dec. 25, 2008

(51) Int. Cl.
    *G06F 15/173* (2006.01)
(52) U.S. Cl. .................. 709/223; 709/224; 715/853
(58) Field of Classification Search .......... 709/222, 709/224; 715/853
    See application file for complete search history.

(56) References Cited

U.S. PATENT DOCUMENTS

| | | | | |
|---|---|---|---|---|
| 5,832,224 A * | 11/1998 | Fehskens et al. | ............. | 709/223 |
| 6,040,834 A * | 3/2000 | Jain et al. | ............. | 715/853 |
| 7,139,768 B1 * | 11/2006 | Janzig et al. | ............. | 707/102 |
| 2003/0055878 A1 * | 3/2003 | Fletcher et al. | ............. | 709/203 |
| 2003/0110242 A1 * | 6/2003 | Brown et al. | ............. | 709/222 |
| 2003/0144892 A1 * | 7/2003 | Cowan et al. | ............. | 705/8 |
| 2003/0208533 A1 * | 11/2003 | Farquharson et al. | ........ | 709/203 |
| 2004/0226002 A1 * | 11/2004 | Larcheveque et al. | ........ | 717/126 |
| 2005/0050141 A1 * | 3/2005 | An et al. | ............. | 709/203 |
| 2005/0165810 A1 * | 7/2005 | Yokoyama | ............. | 707/100 |
| 2005/0276233 A1 * | 12/2005 | Shepard et al. | ............. | 370/254 |
| 2005/0283531 A1 * | 12/2005 | Chen et al. | ............. | 709/225 |
| 2006/0075387 A1 * | 4/2006 | Martin et al. | ............. | 717/124 |
| 2006/0095860 A1 * | 5/2006 | Wada et al. | ............. | 715/771 |
| 2007/0022404 A1 * | 1/2007 | Zhang et al. | ............. | 717/103 |
| 2007/0266035 A1 * | 11/2007 | Hays et al. | ............. | 707/10 |

OTHER PUBLICATIONS http://www-306.ibm.com/software/solutions/soa/, "Service Oriented Architecture—SOA", pp. 1-2, printed Jun. 13, 2007.
"Providing what you need to get started with SOA", IBM brochure printed at ftp://ftp.software.ibm.com/software/solutions/pdfs/soa_G224-7539-00_0919_SS.pdf, pp. 1-2.
"IBM SOA Foundation: providing what you need to get started with SOA", White Paper, Sep. 2005, printed from ftp://ftp.software.ibm.com/software/solutions/pdfs/SOA_g224-7540-00_WP_final.pdf, pp. 1-12.
http://www-03.ibm.com/autonomic/wsdm/product.html, "WSDM Standards", pp. 1-4, printed Jun. 13, 2007.
http://www.alphaworks.ibm.com/demo/flash/display/wsdmbrowser0, "Demo of WSDMBrowser and WSDM-CIM Bridge", pp. 1-26, printed Jun. 18, 2007.

* cited by examiner

*Primary Examiner* — Thomas Dailey
(74) *Attorney, Agent, or Firm* — Martin & Associates LLC; Bret J. Petersen (57) ABSTRACT

An apparatus and method provides visualization of IT resources that are exposed as WSDM resources. A management system with a console provides visibility and functionality for WSDM resources by employing a visualization mechanism that processes standardized visualization metadata that is sent from a WSDM resource. The visualization mechanism uses standardized information to enable the management system console to display a robust presentation of the resource without needing to update the management system and console code when new types of resources are added.

16 Claims, 6 Drawing Sheets

Standardized Visualization Metadata Example

300

```
<Property id="name">
    <Label value="Name"/>
    <Type value="STRING"/>
    <Description value= "The displayable name of the resource."/>
    <MinLength value="1"/>
    <MaxLength value="500"/>
    <Displayable value="true"/>
    <Editable value="true"/>
    <Required value="true"/>
    <SortOrder value="1"/>
</Property>
```

FIG. 3

Standardized Visualization Metadata Example

400

```
<Property id="status">
    <Label value="Status"/>
    <Type value="STATUS"/>
    <Description value="The current status for the resource."/>
    <Displayable value="true"/>
    <Editable value="false"/>
    <Required value="false"/>
    <SortOrder value="4"/>
    <Values value="OK,Warning,Error,Critical,Informational"/>
</Property>
```

VISUALIZATION OF WEB SERVICES DISTRIBUTED MANAGEMENT (WSDM) RESOURCES

BACKGROUND

1. Technical Field

This invention generally relates to management of information technology (IT) resources, and more specifically relates to an apparatus and method for visualization of web services distributed management resources.

2. Background Art

Computer system managers have the complex task of dealing with many different computer resources. Web Services Distributed Management (WSDM) is a new standard for web services management that provides a consistent, flexible interface to manage disparate resources without knowing their types, models, or their implementation technologies. The WSDM standards specify a common messaging protocol for managed resources and their consumers. The WSDM standard specifies how the manageability of a resource is made available to manageability consumers via Web Services.

Part of the WSDM standard describes Management Using Web Services (MUWS). This part of the standard incorporates management of IT resources. In order to leverage the value of WSDM, IT resource producers model them or expose them as WSDM resources. This provides a standard way for customers, third parties, and other IT resource providers to manage these resources. In a customer environment where IT resources have been provided by multiple suppliers, exposing the IT resources as WSDM resources gives the customer a way to manage them all consistently, by using tools that are built to the WSDM standard. As used herein, exposing an IT resource as a WSDM resource means to provide a software interface that presents the IT resource as a WSDM resource.

However, WSDM presents a challenge in the area of visualization of resources. Management tools typically provide a management console or user interface that provides information to system administrators about the managed resources via tables, graphical topology maps, and other views. The standard features of WSDM allow management tool providers to display and browse managed resources and their properties on a management console. However, WSDM does not readily enable management tools to provide a robust management console or user interface as users are accustomed to when managing resources from a management console. A WSDM console could be enhanced to provide a better visualization of the resources, but the console would need to be updated or reprogrammed each time a new type of resource is added to the system because much of the type-specific data needed by the management console to provide the desired visualization for each resource is not defined by WSDM.

A management console using WSDM would suffer from several limitations. For example, a WSDM console would be capable of displaying only a rudimentary view of the IT assets in the system. It would lack the ability to abstract the raw information or provide language translation using only the limited data available from the WSDM resource. Further, there is no facility within WSDM to provide the set of operational actions that are valid at a given time to provide context sensitive options.

Without a way to more effectively capitalize on the WSDM environment and provide a visualization of WSDM resources, it will be costly to provide system administrators with management systems to effectively visualize and manage IT resources.

BRIEF SUMMARY

An apparatus and method is described for visualization of IT resources that are exposed as WSDM resources. A management system with a console provides visibility and functionality for WSDM resources by employing a visualization mechanism that processes standardized visualization metadata that is sent from a WSDM resource. The visualization mechanism uses standardized information to enable the management system console to display a robust presentation of the resource without needing to update the management system and console code when new types of resources are added.

The description and claims herein are directed to a generic computer architecture and thus could be implemented on any suitable computer system.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The disclosure and claims herein are directed to an apparatus and method for visualization of IT resources that are exposed as WSDM resources. A management system with a console provides visibility and functionality for WSDM resources by employing a visualization mechanism that processes standardized visualization metadata that is sent from a WSDM resource. The visualization mechanism uses standardized information to enable the management console to display a robust presentation of the resource without needing to update the management system and console code when new types of resources are added.

Figure 1:
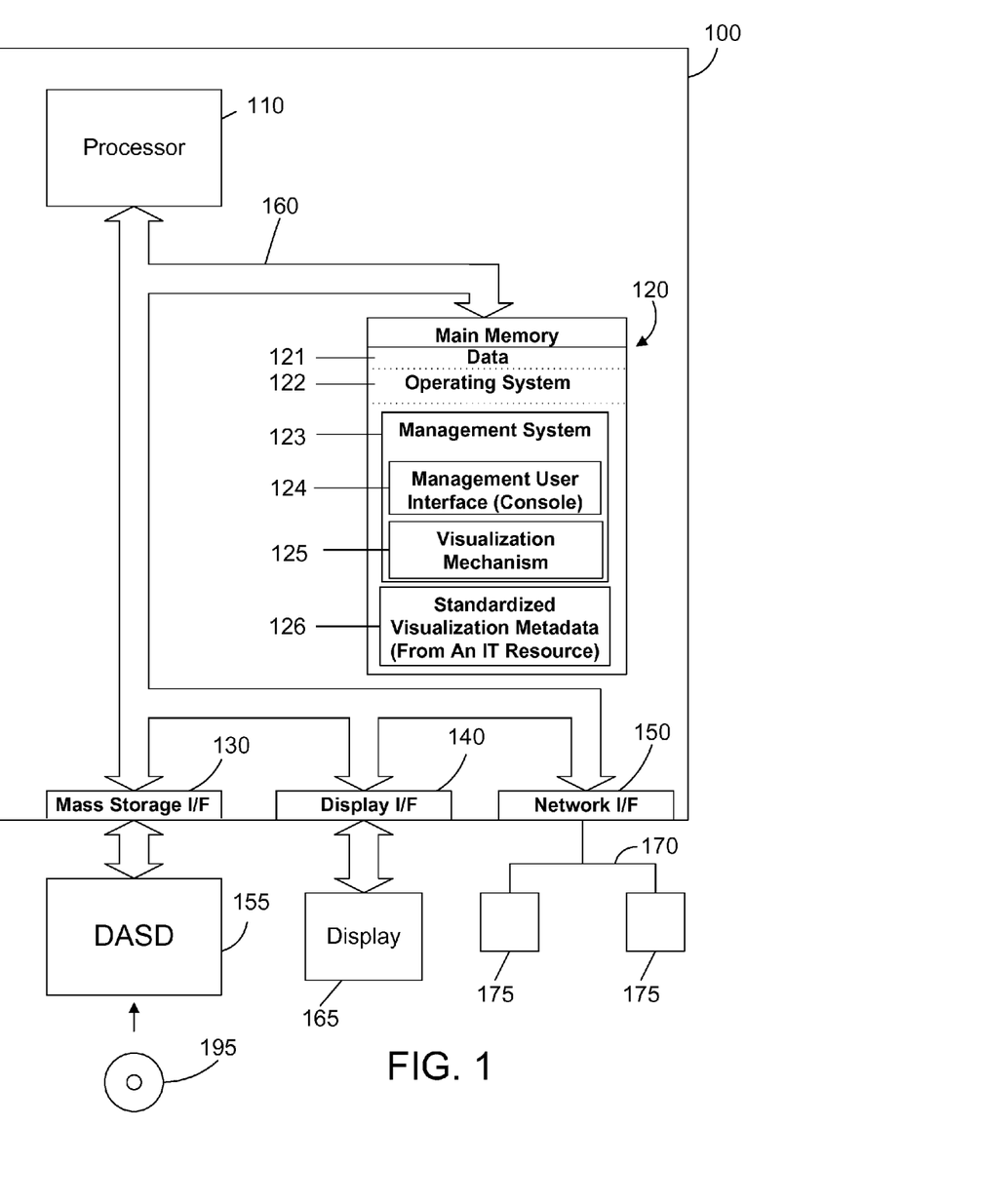
FIG. 1 is a block diagram of a computer system with a management system having a visualization mechanism as described herein.

Referring to FIG. 1, a computer system 100 is one suitable implementation of the apparatus and method described herein. Computer system 100 is an IBM System x™ or IBM System p™ computer system. However, those skilled in the art will appreciate that the methods and apparatus described herein apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 132, a display interface 140, and a network interface 150. These system components are interconnected through the use of a system bus 160. Mass storage interface 132 is used to connect mass storage devices, such as a direct access storage device 155, to computer system 100. One specific type of direct access storage device 155 is a readable and writable CD-RW drive, which may store data to and read data from a CD-RW 195.

Main memory 120 contains data 121, an operating system 122, a management system 123, a management user interface (console) 124, a visualization mechanism 125, and standardized visualization metadata received from an IT resource 126. Data 121 represents any data that serves as input to or output from any program in computer system 100. Operating system 122 is a multitasking operating system known in the industry as i5/OS; however, those skilled in the art will appreciate that the spirit and scope of this disclosure and claims are not limited to any one operating system. The management system 123 provides management of WSDM resources according to the established standards. The management system 123 provides visibility and functionality for IT resources exposed as WSDM resources through the management user interface or console 124 in conjunction with the visualization mechanism 125. The console 124 and the visualization mechanism 125 may be part of the management system 123 as shown or they may be separate software entities on the same or a different platform. The visualization mechanism 125 processes standardized visualization metadata 126 that is sent from an IT resource and provides it to the console 124. Standardized visualization metadata is any data that supports visualization of the IT resource and is provided in a standardized format that can be processed by the visualization mechanism for visualization of the resource on the console. The management system 123, the console 124, the visualization mechanism 125, and the standardized visualization metadata 126 received from an IT resource are each described in more detail in the paragraphs below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and the other memory elements discussed above are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. Thus, while the management system 123, the console 124, and the visualization mechanism 125 are shown to reside in the memory 120 of computer 100, they may in fact resides on memory located in different physical computers.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a WSDM system and visualization mechanism described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that the credit card verifier described herein applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The WSDM system and visualization mechanism described herein applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the WSDM system and visualization mechanism have been and will continue to be described in the context of a fully functional computer system, those skilled in the art will appreciate that the WSDM system and visualization mechanism described herein is capable of being distributed as an article of manufacture in a variety of forms, and that the claims extend to all types of computer-readable media used to actually carry out the distribution. Examples of suitable computer-readable media include: recordable media such as floppy disks and CD-RW (e.g., 195 of FIG. 1).

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The disclosure and claims herein describe using standardized metadata to provide visualization information for a WSDM resource to a WSDM management system. Resource producers would provide the visualization metadata for their resources as an extension of the WSDM resource representation in the resource instrumentation code. The console can then use the visualization information that is associated with the resource model in order to display and operate on the WSDM resources. Since the visualization metadata is supplied from the resource instrumentation in a standardized format, consoles may be implemented that exploit the full pluggability advantages of WSDM, i.e. they do not need to be updated every time a new resource type is produced by any provider that could show up in the customer environment. Manageable resource implementations can be introduced dynamically to the console without requiring corresponding changes to console code. Resources that do not provide the metadata can be displayed using a default visualization (least common denominator approach, default icons, non-globalized, etc.). This allows for all the resources in the managed environment to be represented in the management console, even though some resource types have not supplied visualization metadata.

As introduced in the background, WSDM introduces some challenges to visualization of managed resources. These challenges include basic presentation of resource information, globalization enablement, context sensitive presentation of operational actions and relationship presentation. Resource presentation is problematic since WSDM resources provide raw, unfiltered information. It is often desirable to filter, organize or abstract some of this information when presenting it in a console. For example, a resource called "Operating System" may contain properties such as Name, OSVersion, LastBootupTime and FreeVirtualMemory which may be appropriate to display to most/all console users. But it might also contain a property called CreationClassName which probably should not be displayed to a console user. In order to appropriately display this information in the console, the visualization mechanism (described below) will detect properties that have been marked in the standardized metadata for non-display on the console. Additional metadata is also included to support user editing of these properties in a generic fashion by the console.

When exposing a resource using WSDM, resource information (such as resource names, property names, operation names, parameter names, etc.) is defined in WSDL (Web Services Definition Language) in the language of the person preparing the interfacing software. In a console, this resource information needs to be displayed in the language of the console user, but WSDM resources provide no information to enable translation. As described below, the standardized metadata can include translated text strings in the language of the local user.

While prior art consoles had the capability to only offer actions on a resource that are valid at the point in time, there is no support in WSDM that would allow a console to determine the valid operations and valid parameters for a resource at a point in time. For example, consider a WSDM resource "OSContainer" that supports an operation called "SetPower". It takes a value of 0 or 1 as a parameter depending on whether the OSContainer is being powered off or powered on. Regardless of the exact method chosen for displaying this function to the console user, you don't want to offer them an action that is invalid (e.g. powering off an OSContainer that is already off). As described below, standardized visualization metadata includes data that indicates the status of the device. This data is used by the visualization mechanism to determine what operations are currently valid to display to the user.

Similarly, WSDM does not provide support for the proper visualization of relationships in a console. A common operation on many management consoles is to create a relationship between two resources (e.g. add a node to a cluster). However, WSDM provides no facility to verify what relationships are valid between various resource types, so relationship creation from a console becomes impossible to implement in a type-independent manner. In addition, simple visual depiction of relationships is only minimally supported by WSDM. Thus any WSDM console would likely lack relationship information to display a color and line style on the console that indicates the type of these relationships. The standardized visualization metadata described below includes metadata necessary to properly depict resource relationships on a topology map on the console. Further, the visualization mechanism can insure that only valid relationships are created.

Figure 2:
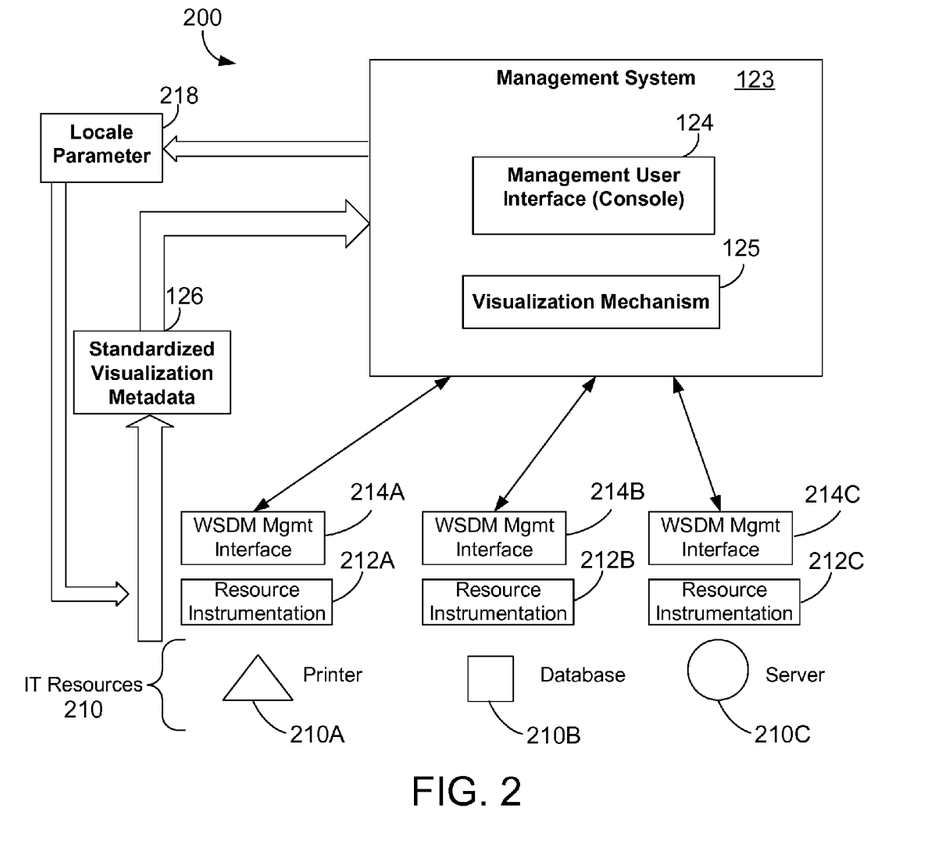
FIG. 2 is a block diagram of a management system with a visualization mechanism that uses standardized visualization metadata.

FIG. 2 illustrates a block diagram of a WSDM management environment 200 that has a management system 123 that manages IT resources 210 that are exposed as WSDM manageable resources. Preferably, the management system uses the WSDM 1.1 standard defined by the Organization for the Advancement of Structured Information Standards (OASIS). Further, the management system 123 includes a management user interface or console 124 that a human system administrator uses to interact with and control the management system 123. A visualization mechanism 125 processes standardized visualization metadata 126 from IT resources 210 to provide the enhanced visualization in a WSDM management systems.

Again referring to FIG. 2, the IT resources 210 can include a variety of resources, such as a printer 210A, a database 210B, and a server 210C. Each of the IT resources 210 communicate with the WSDM management system 123 through resource instrumentation 212A-212C and a WSDM management interface 214A-214C. The resource instrumentation is device specific, lower level management code that supports the operation of the IT resource 210 through the management interface 214A-214C. Each resource instrumentation includes the coded information about the IT resource to allow the WSDM management interface 214 to provide the standardized visualization metadata 126 for the resource to the management system. In FIG. 2 an arrow is used to represent the flow of the standardized visualization data 126 from the IT resources, to the WSDM management interfaces 214A-214C and then to the management system. The visualization metadata is provided as part of the manageable resource instrumentation as described further below.

The console 124 provides a graphical representation of the resources managed by the management system 123 to a display 165 (FIG. 1). At some point, the console in the management system will request all standardized visualization metadata be retrieved for each resource type for the display. This data could be requested at the initial startup of the system and then stored by the console for future use, or it could be retrieved as each type of resource is needed. The console can be updated as changes are made to the management environment 200. The retrieval of metadata by the management system 123 is accomplished via a web service call to the WSDM management interface 214A-214C as defined by the WSDM Management Using Web Services (MUWS) protocols of the WSDM standard. The retrieval of metadata interface can be done for any resource type supports the operation to retrieve associated metadata of a WSDM web service call.metadata. For example when a server resource is accessed with MUWS, data is returned from the WSDM interface. The data is returned in an extensible mark-up language (XML) document in response to the web service call for the resource's metadata. If a resource type has no metadata then the default visualization would be used as described above.

Again referring to FIG. 2, the visualization of the managed resources herein provides globalization behavior by allowing the console to display text in the local language corresponding to the language of the locale of the computer system hosting the management system. To support the globalization behavior, the locale of the user of the console would be passed to the resource instrumentations as a locale parameter 218 when sending a message to retrieve the metadata. The metadata returned would contain translated strings (where appropriate) that are suitable for display on the console for a user in that locale. The appropriate translated strings are passed to the console by the visualization mechanism 125. If the locale is not passed to the resource as part of a resource property message exchange, then the resource instrumentation of the managed resource would assume the locale of its hosting system and return the displayable content using the language of that locale.

Figure 3:
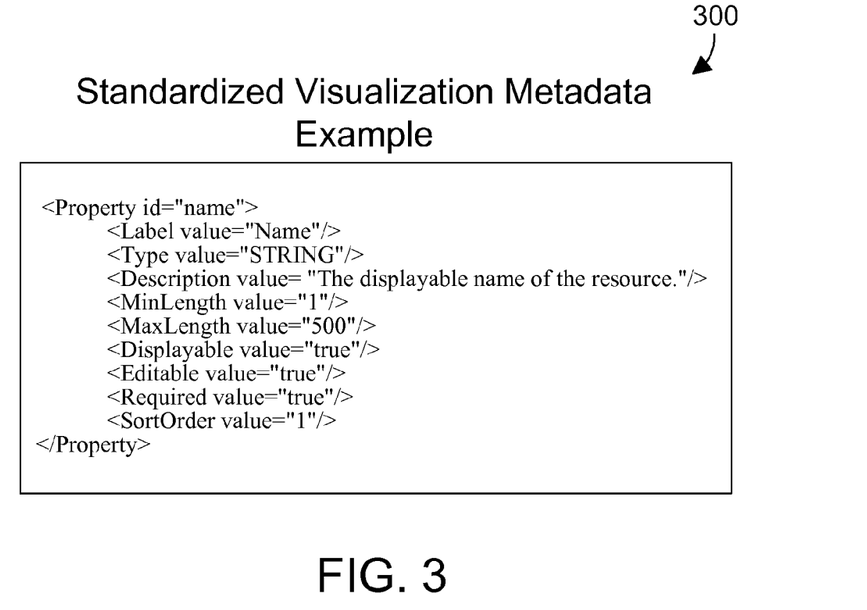
FIG. 3 is an example of standardized visualization metadata for a managed IT resource.
Figure 4:
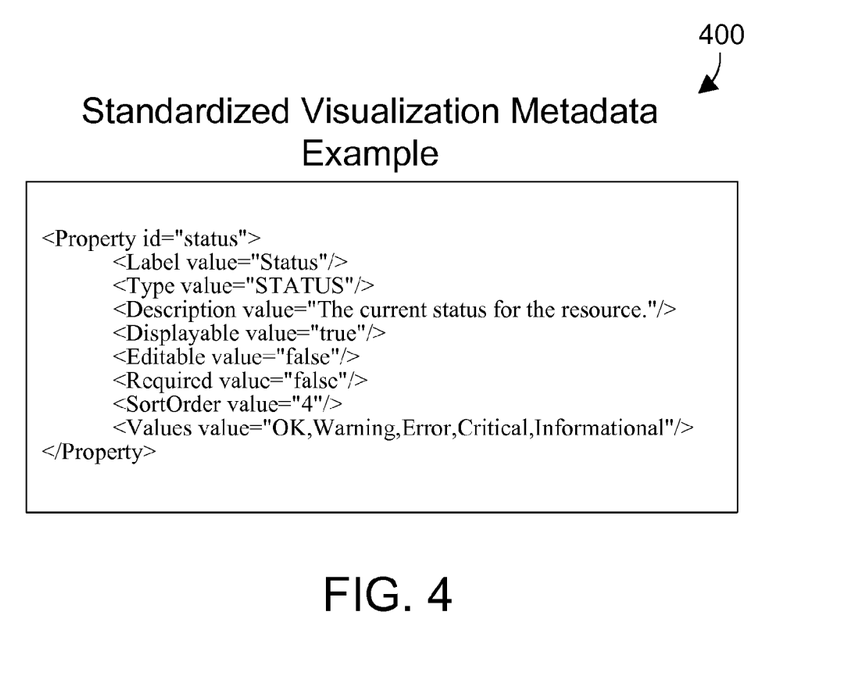
FIG. 4 is another example of standardized visualization metadata for a managed IT resource.

A call to retrieve all the metadata for a WSDM supported server resource would return metadata relating to properties, operations, states, etc. of the server. FIGS. 3 and 4 illustrate examples of the metadata that is returned for two server properties. FIG. 3 shows the metadata for the "name" property, which would describe the server name. The metadata includes a Label (translated text for the name of the property), a Type for display and validation purposes, a text description for the property (translated text for the description of the property). The metadata also includes an indication of whether or not the property is appropriate to be displayed (some properties may not interest the user and normally need not be displayed on the console). An example of other metadata is shown in the examples below. Similarly, FIG. 4 shows the "status" property that would describe the server's status.

Figure 5:
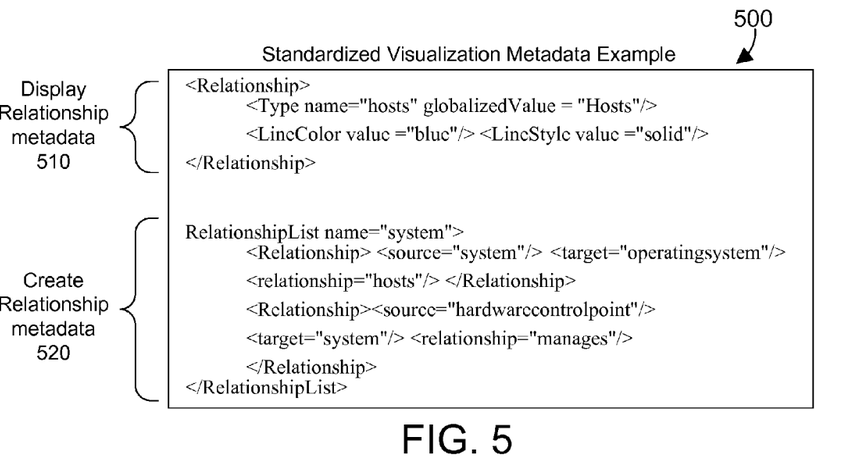
FIG. 5 is another example of standardized visualization metadata for a managed IT resource.

FIG. 5 illustrates examples of "relationship" metadata. The first section of this example illustrates a relationship property that describes how to display a host relationship on the console 510. The second section illustrates relationship metadata 520 that is used when a relationship is created. The create relationship metadata 520 specifies the allowed types of relationships. The create relationship metadata is passed to the visualization mechanism to indicate what relationships may be created on the management console by the system administrator.

In addition to the specific examples described above, the claims herein further extend to other aspects of the IT resource that can benefit from enhanced visualization on the console with standardized visualization metadata. For example, metadata would also be provided for each operation supported by a resource and for the categories these operations might be grouped in (interfaces).

The standardized visualization metadata may also contain a graphical representation or icon to represent the IT resource on the console. The optional icon may be transmitted as a ".gif" file to convey the "type" of the manageable resource to be visualized. Therefore, this icon could reflect the marketing logo of the manageable resource provider or manufacturer. Thus an International Business Machines Corporation (IBM) icon for a server manageable resource would be distinct from the icon representing a Hewlett Packard server manageable resource.

Figure 6:
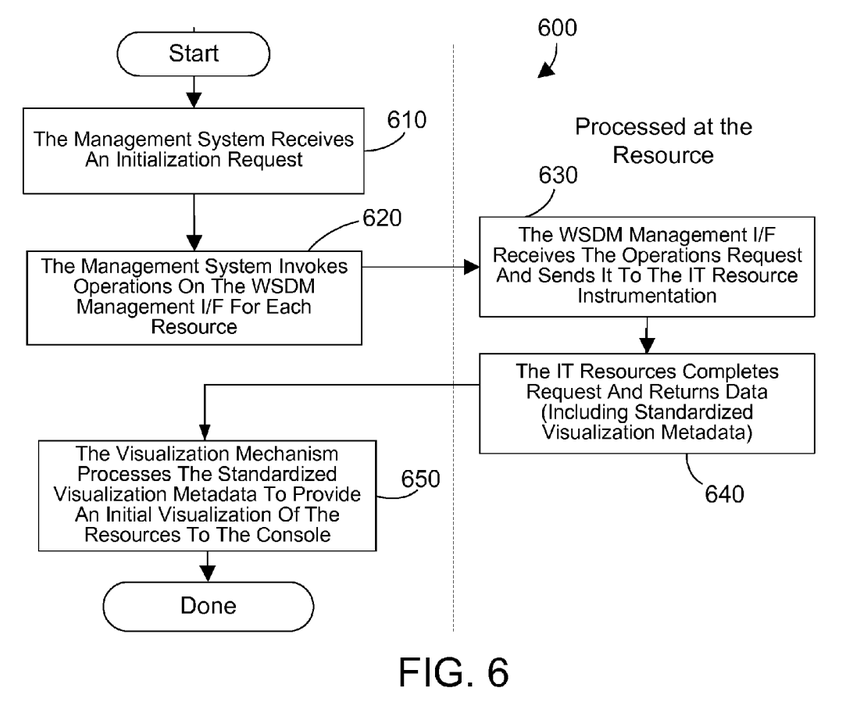
FIG. 6 illustrates an initialization method flow diagram for visualization of WSDM resources.

FIG. 6 illustrates a method 600 for initialization of a management system with a visualization mechanism and standardized visualization metadata. This method operates on a host computer system 100 described above with reference to FIG. 1. The method 600 begins when the management system receives an initialization request or when the management system is initially invoked on the system (step 610). The management system receives the initialization request and invokes an operation on the WSDM management interface for all resource types (step 620) to retrieve their metadata. A locale is passed on each of these requests from the console. At each resource, the WSDM management interface receives the metadata request. For metadata that requires translation of strings, non-globalized keys defined in the metadata are passed to translation functions to obtain their translated equivalent for the locale. The IT resource completes the request by substituting translated strings for the keys, and returning the requested visualization metadata to the management system (step 640). The visualization mechanism then processes the standardized visualization metadata and provides data for each of the resources to the console to provide an initial visualization of the resources (step 650). The method is then done.

Figure 7:
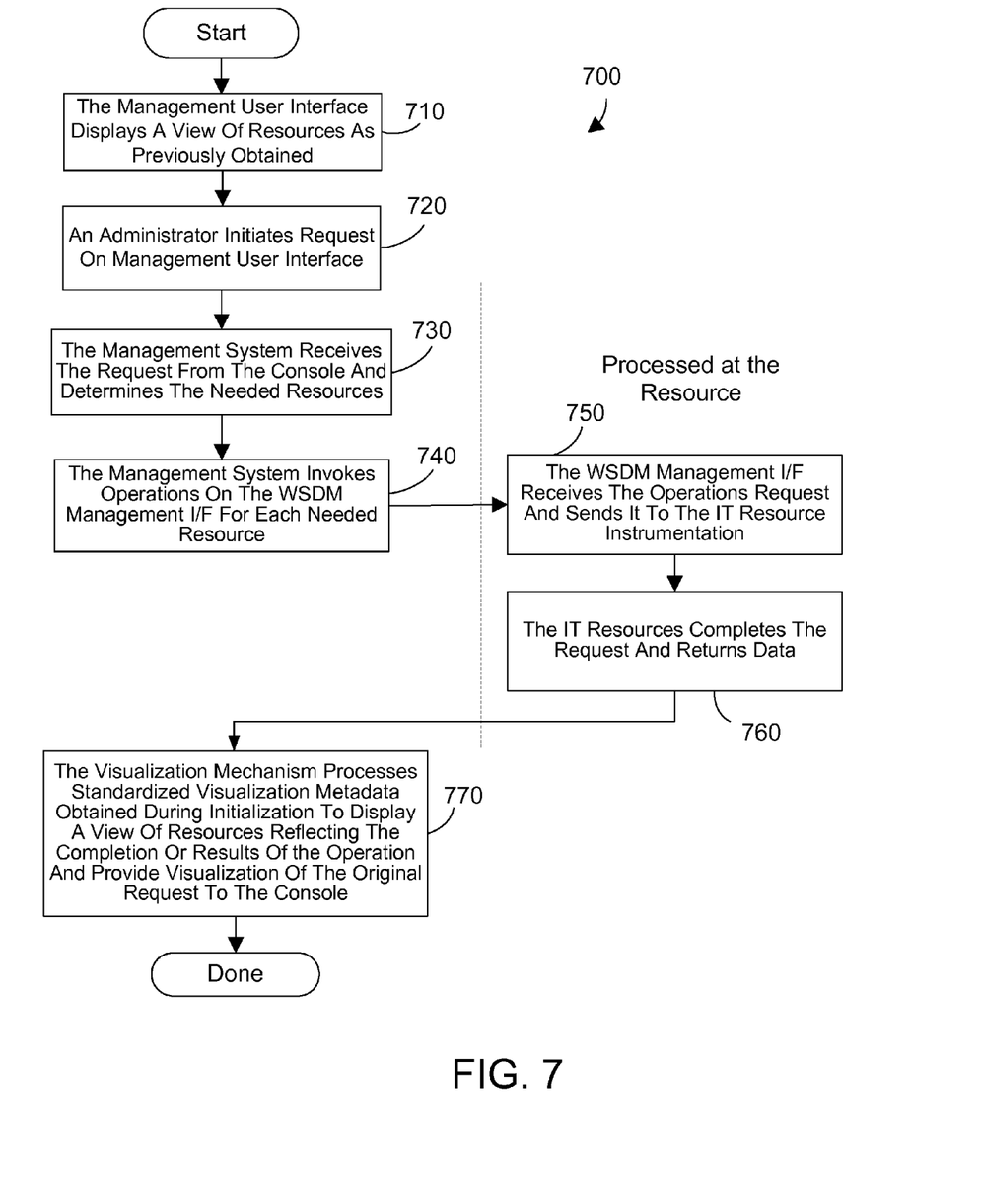
FIG. 7 illustrates a method flow diagram for visualization of WSDM resources.

FIG. 7 illustrates a method 700 for a management system with a visualization mechanism and standardized visualization metadata. This method operates on a host computer system 100 described above with reference to FIG. 1. The method 700 begins by displaying a view of all the resources using the previously obtained metadata (step 710). The previously obtained view may be as initialized by method 600, or as previously modified by the system administrator. A system administrator initiates a request on the management user interface or console (step 720). The request by the administrator may require that the state of the resource be determined to display valid options on the menu as described below with reference to FIG. 8. The management system receives the request form the console and determines the needed resources (step 730). The management system then invokes operations on the management interface for each needed resource (step 740). At each need resource, the WSDM management interface receives the operation request and sends it to the IT resource's instrumentation (step 750). The IT resource completes the request by returning the requested data, including standardized visualization metadata to the management system (step 760). The visualization mechanism then processes the standardized visualization metadata obtained during the initialization flow in order to display a view of resources reflecting the completion or results of the original request to the console (step 770). The method is then done.

Figure 8:
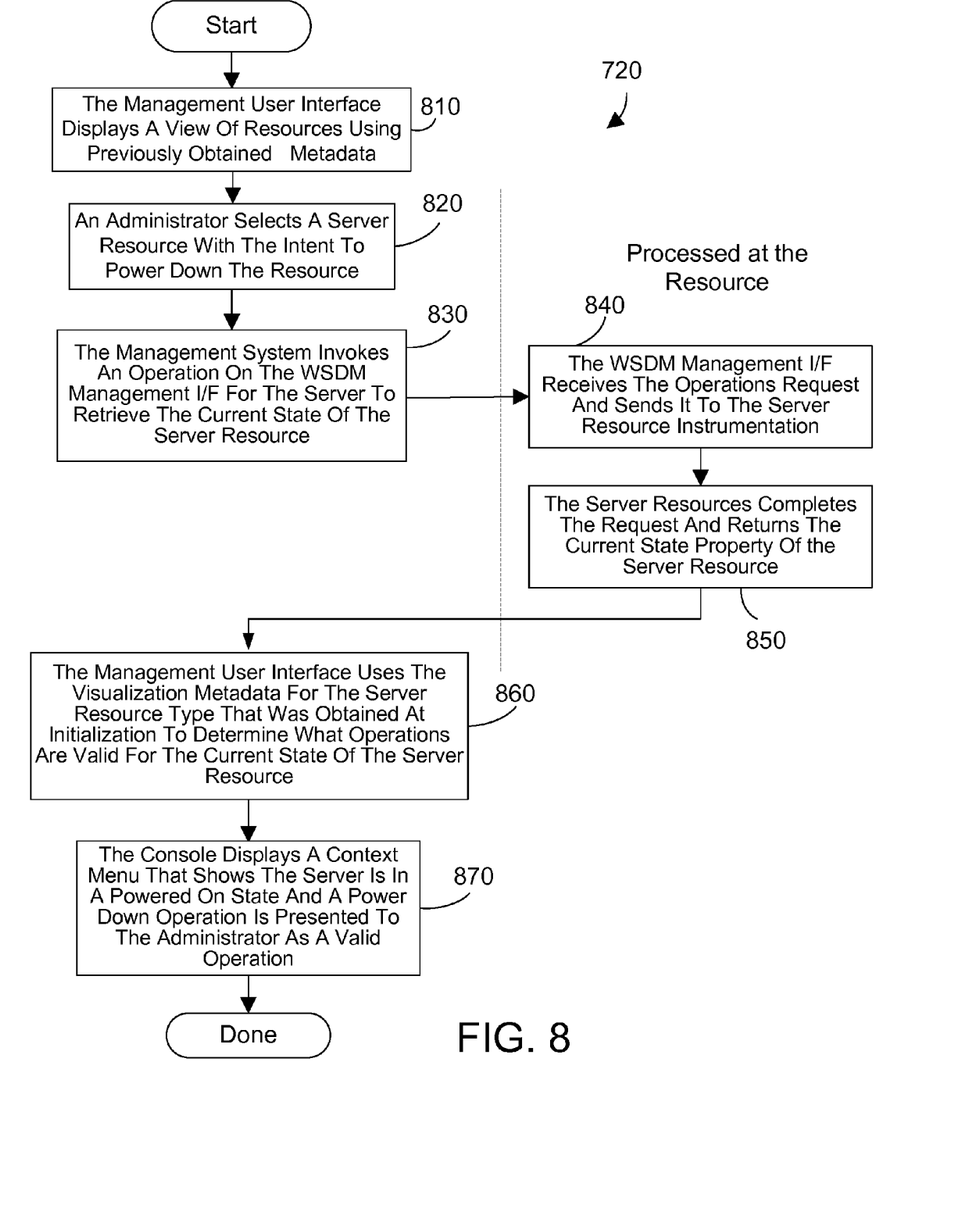
FIG. 8 is a method flow diagram for an example of visualization of WSDM resources.

FIG. 8 illustrates a method 720 for a management system with a visualization mechanism and standardized visualization metadata. Method 720 illustrates a possible implementation for step 720 in FIG. 7. The method 720 begins by displaying a view of all the resources using previously obtained metadata (step 810). For this example, an administrator then selects a server resource on the console with the intent to power down the resource (step 820). The management system invokes an operation on the WSDM management I/F for the server to retrieve the current state of the server resource (step 830). The WSDM management I/F receives the operation request and sends it to the server resource instrumentation (step 840). The server resource instrumentation completes the request and returns the current state property of the server resource (step 850). The management user interface uses the visualization metadata for the server resource type that was obtained at initialization to determine what operations are valid for the current state of the server resource (step 860). The console displays a context menu that shows the server is in a powered on state. The state may be shown in the depiction of the resource on the console. The depiction of the resource that shows the powered on state can be done by changing color, shading or any other indication that the resource is in a power-on state. Further, the menu presents to the administrator valid operations for the current state of the server, including a power down operation (step 870). The method is then done.

The disclosure herein describes a method and apparatus to provide robust visualization of IT resources using WSDM management using web services (MUWS). The visualization mechanism and the standardized visualization metadata allow the management console to provide a robust presentation of the resource without needing to update the management console code when new resources are added. This allows for increased manageability of IT resources by system administrators and increased efficiency to management software and IT resource software providers.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer apparatus comprising:
    at least one processor;
    a memory coupled to the at least one processor;
    a web services distributed management (WSDM) system executing on the at least one processor managing a plurality of information technology (IT) hardware resources exposed as WSDM resources including printers, databases and servers;
    standardized visualization metadata received from the IT hardware resources, wherein the standardized visualization metadata is data in a standardized format that comprises data concerning a corresponding of the plurality of IT hardware resource comprising: a graphic data file with a visual image of the IT resource, resource properties, resource operations, metadata to depict relationships of IT hardware resources on a topology map, and metadata of resource states to determine the valid operations and valid parameters for an IT hardware resource at a point in time; and
    a visualization mechanism that processes the standardized visualization metadata to provide visualization of the IT hardware resources on a management user interface of the WSDM system, wherein the visualization mechanism dynamically updates the visualization of IT hardware resources on the management user interface without requiring code changes to the management user interface.

2. The computer apparatus of claim 1 wherein the standardized visualization metadata from the IT hardware resource is provided through a WSDM management interface at the IT hardware resource from resource instrumentation software that includes information about the resource that is used by the WSDM management interface to provide the standardized visualization metadata.

3. The computer apparatus of claim 2 wherein the management user interface provides a locale parameter to the IT resource to enable the IT resource to return in the standardized visualization metadata translated strings in the language of the management user interface user.

4. The computer apparatus of claim 1 wherein the visual image of the IT hardware resource illustrates the marketing logo of the manufacturer of the IT resource.

5. A computer implemented method for providing visualization of a web services distributed management (WSDM) managed resource comprising the steps of:
    receiving an initialization request on a WSDM management interface for a WSDM system for managing a plurality of information technology (IT) hardware resources exposed as WSDM resources including printers, databases and servers;
    sending a communication over a WSDM network to invoke operations on the WSDM management interface to retrieve metadata from information technology (IT) hardware resources;
    receiving standardized visualization metadata from the IT hardware resources, wherein the standardized visualization metadata is data in a standardized format that comprises data concerning the IT hardware resources comprising: resource properties, resource operations, metadata to depict relationships of IT hardware resources on a topology map, and metadata of resource states to determine the valid operations and valid parameters for an IT hardware resource at a point in time; and
    processing the standardized visualization metadata to provide an initial visualization of the IT hardware resources in the WSDM management user interface without requiring code changes to the WSDM management interface.

6. The computer implemented method of claim 5 wherein the WSDM management interface communicates with the IT hardware resources through a resource instrumentation software that includes information about each hardware IT resource that is used by the WSDM management interface to provide the standardized visualization metadata.

7. The computer implemented method of claim 6 wherein the standardized visualization data further comprises translated strings for the locale of the user.

8. The computer implemented method of claim 5 wherein the visual image of each IT hardware resource illustrates the marketing logo of the manufacturer.

9. The computer implemented method of claim 5 further comprising the steps of:
    receiving a request from the management user interface;
    determining a needed IT hardware resource exposed as a WSDM resource for the request;
    sending a communication over a WSDM network to invoke operations on a WSDM management interface for the needed IT hardware resource;
    receiving data from the needed IT hardware resource; and
    processing the standardized visualization metadata and the data from the needed IT hardware resource to provide visualization of the needed IT hardware resource in the management user interface.

10. The computer implemented method of claim 5 further comprising the steps of:
    determining an administrator selecting an IT hardware resource;
    invoking an operation on the WSDM management interface to retrieve the current state of the selected IT hardware resource;
    receiving data from the selected IT hardware resource for the current state of the selected IT hardware resource;
    using the visualization metadata and the data from the selected IT hardware resource to determine what operations are valid for the current state of the selected IT hardware resource; and
    displaying a context menu that shows the current state of the selected IT hardware resource and valid operations on the selected IT hardware resource for the current state.

11. The computer implemented method of claim 10 wherein the administrator selects the IT hardware resource with the intent to perform an operation and the context menu presents only valid operations to the administrator based on the state of the selected IT hardware resource.

12. An article of manufacture comprising:
(A) a web services distributed management (WSDM) system for managing a plurality of information technology (IT) hardware resources exposed as WSDM resources including printers, databases and servers comprising:
standardized visualization metadata received from the IT hardware resources, wherein the standardized visualization metadata is data in a standardized format that comprises data concerning a corresponding IT hardware resource comprising: resource properties, resource operations, metadata to depict relationships of IT hardware resources on a topology map, and metadata of resource states to determine the valid operations and valid parameters for an IT hardware resource at a point in time;
a visualization mechanism that processes the standardized visualization metadata to provide visualization of the IT hardware resource on a management user interface, wherein the visualization mechanism dynamically updates the visualization of IT hardware resources without requiring code changes to the management user interface; and
(B) computer recordable media bearing instructions for the WSDM management system to execute on a computer system.

13. The article of manufacture of claim 12 wherein the standardized visualization metadata from the IT hardware resource is provided through a WSDM management interface at the IT hardware resource from resource instrumentation software that includes information about the IT hardware resource that is used by the WSDM management interface to provide the standardized visualization metadata.

14. The article of manufacture of claim 13 wherein the console provides a locale parameter to the IT hardware resource to enable the IT hardware resource to provide translation strings in the language of the management system locale.

15. The article of manufacture of claim 12 wherein the standardized visualization data comprises a graphic data file that provides a visual image of the IT hardware resource.

16. The article of manufacture of claim 15 wherein the visual image of the IT hardware resource illustrates the marketing logo of the manufacturer of the IT hardware resource.

* * * * *